Dec. 22, 1936.   F. E. TURNER ET AL   2,065,107
APPARATUS FOR PARKING AND DELIVERING VEHICLES
Filed Feb. 26, 1934   9 Sheets-Sheet 2

INVENTORS
Frederick E Turner and
William P Allred Jr.
BY
ATTORNEY

Dec. 22, 1936.  F. E. TURNER ET AL  2,065,107
APPARATUS FOR PARKING AND DELIVERING VEHICLES
Filed Feb. 26, 1934  9 Sheets-Sheet 4

INVENTORS
Frederick E. Turner and
William P. Allred Jr.
BY
ATTORNEY

Dec. 22, 1936.　　F. E. TURNER ET AL　　2,065,107
APPARATUS FOR PARKING AND DELIVERING VEHICLES
Filed Feb. 26, 1934　　9 Sheets-Sheet 7

INVENTORS
Frederick E. Turner and
William P. Allred Jr.
BY
ATTORNEY

Dec. 22, 1936.　　　F. E. TURNER ET AL　　　2,065,107
APPARATUS FOR PARKING AND DELIVERING VEHICLES
Filed Feb. 26, 1934　　　9 Sheets-Sheet 9

INVENTORS
Frederick E. Turner and
William P. Allred Jr.
BY
ATTORNEY

Patented Dec. 22, 1936

2,065,107

UNITED STATES PATENT OFFICE 2,065,107

APPARATUS FOR PARKING AND DELIVERING VEHICLES

Frederick E. Turner and William P. Allred, Jr., Kansas City, Mo.; Katharine Turner executrix of will of said Frederick E. Turner, deceased Application February 26, 1934, Serial No. 712,942

32 Claims. (Cl. 104—50)

Our invention relates to vehicle moving apparatus and more particularly to apparatus of that character for moving vehicles onto and from elevators of storage or parking garages, the present invention constituting a continuation, in part, of our copending application, Serial No. 583,208, filed December 26, 1931.

As in the above noted application, the principal objects of our invention are to provide apparatus for receiving a vehicle from a patron, parking the vehicle on any pre-selected floor and space of a garage or storage building and delivering the vehicle to the patron without assistance from the power plant of the vehicle.

Further objects of the invention are to provide improved clutch mechanism for engaging a vehicle axle and means for actuating the mechanism.

Other objects of our invention are to provide vehicle-moving apparatus requiring a minimum number of power units for accomplishing the various movements necessary to park and deliver the vehicle, and to embody means in the apparatus for moving the vehicle slowly at the beginning and end of its travel onto and from the elevator floor and for materially increasing the rate of speed during intermediate portions of its movement.

In accomplishing these and other objects of our invention we have provided improved details of structure, the preferred form of which is illustrated in the accompanying drawings, wherein:

Fig. 24 is a fragmentary view in section and elevation, showing the receiving unit being extended into a parking space and engaged by the pivoted arm of the lock assembly.

Referring more in detail to the drawings:

1 designates the floor of a circular elevator whereon is mounted an annular track 2 serving as a turntable for a platform 3 mounted on flanged wheels 4 engaging the track and carrying an annular rack 5 adapted to be suitably rotated for turning the platform.

The details of construction for effecting rotation of the platform on the elevator form no part of our present invention. Such rotation may, however, be accomplished in a manner similar to that disclosed in Patent No. 1,782,671 issued to W. P. Allred, Jr., on November 25, 1930, and the present vehicle-moving apparatus is particularly adapted for use with the elevator and parking garage shown in the above patent.

The platform 3 further includes a pair of spaced main sills 6 in the form of channels, preferably positioned with their flanges 7 directed toward each other and connected near their ends by cross members 8 and 9 of approximately one-third the width of the sills and fixed centrally to the sills between their upper and lower flanges.

Figure 10:
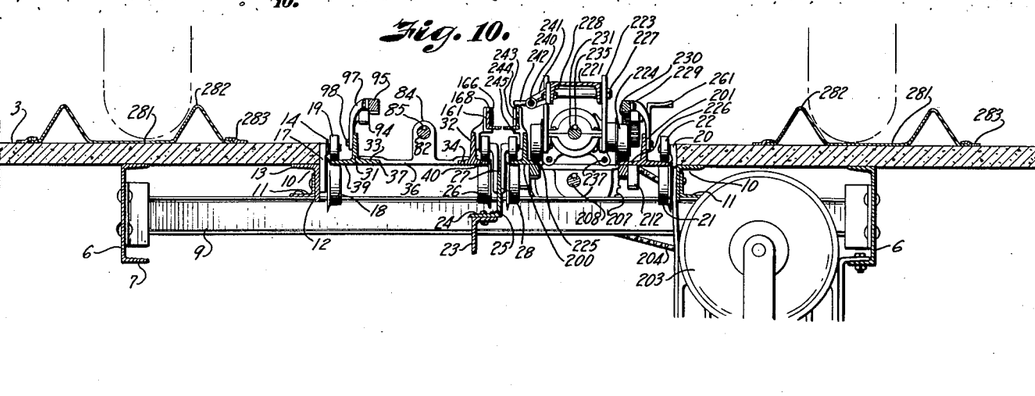
Fig. 10 is a cross section on the line 10—10, Fig. 9.

A pair of supplementary sills 10, located between the main sills and spaced equidistantly therefrom, are mounted on the cross sills and anchored thereto by angles 11 (Fig. 10). The sills 10 preferably comprise angles having depending flanges notched slightly as at 12 to admit the cross sills and having lateral flanges 13 directed outwardly toward the main sills so that a rectangularly-shaped opening 14, bounded on its sides by the flat inner faces of the supplementary sills and on its ends by hatchway lines 15 of the elevator shaft, is provided. A floor 16 having an opening corresponding to the opening 14 is laid over the main and supplementary sills to complete the platform.

Fixed at intervals to the flat inner face of one of the supplementary sills are brackets 17 carrying flanged lower wheels 18 and rollers 19 spaced slightly above the wheels to form guides therewith for a purpose presently disclosed. In like manner, brackets 20, carrying wheels 21 and rollers 22, are fixed to the opposite supplementary sill.

An intermediate sill or support 23, preferably comprising an angle bar fixed at its ends to the cross sills in parallel relation to the supplementary and main sills and substantially midway between the supplementary sills provides a seat 24 whereon are fixed horizontal flanges 25 of a series of angle members 26 carrying brackets 27 and 28 identical to the brackets 17 and 20. It will be noted that the brackets 27 and 28 are mounted on opposite sides of the angle members 26 in transverse alignment with the brackets 17 and 20, respectively.

Wheels and rollers carried by the brackets 27 thus form pairs with the wheels 18 and rollers 19 while the wheels and rollers on the bracket 28 are paired with the corresponding elements on the brackets 20.

Two independent trackways, each comprising parallel series of transversely aligned guides, are thus provided, one serving to mount a vehicle receiving and parking unit 29 and the other being adapted to support and guide a vehicle-delivery unit 30. Although the unit 29 is employed to park and to return a parked vehicle onto the elevator platform, as will later be evident, it will hereinafter be referred to generally as a vehicle-receiving unit to distinguish it from the unit 30.

The receiving and transfer unit 29 will be first described and includes a pair of T-iron rails 31 and 32 having inwardly extending flanges 33 and 34 connected at their opposite ends by cross plates 35 and 36. The ends of the cross plates are upset as shown at 37 to form shoulders for engaging the edges of the inner rail flanges and are fixed to the flanges by bolts 38 or the like to produce a rigid frame for the receiving mechanism.

Outwardly directed flanges 39 and 40 of the T-rails 31 and 32, respectively, are mounted between the pairs of wheels 18 and rollers 19 so that the frame or support comprising the rails and connecting cross plates is readily movable longitudinally in the guides for extension and retraction necessary to move a vehicle as will later be apparent.

In order to move the support longitudinally along its trackway propelling mechanism is provided including a shaft 41 having one end journaled in a bearing 42 mounted on the cross sill 8 and its opposite end journaled in spaced aligned bearings 43 carried by a frame-like bracket 44 having a dropped end 45 mounted on the seating flange 24 of the intermediate sill 23 and its opposite end anchored to the supplementary sill carrying the brackets 17 as disclosed at 46.

The bearing bracket 44 is located at approximately the center of the elevator platform and it is desirable to suitably reinforce the sill structure at this point, as for example, with crossed channels 47 arranged back to back and secured to the lower flanges of the main sills by bolts or like fastening means 48.

Welded to the underside of each of the rails 31 and 32 is a rack bar 49 comprising aligned end sections 50 and an intermediate section 51 offset laterally from and of materially less depth than the end section to mesh with the larger gears 52 of gear units 53 carried on a counter shaft 54 journaled in bearings 55 of the bracket 44 in transverse relation to the shaft 41. The smaller gears 57 and 58 fixed respectively on the counter shaft 54 and on a stub shaft 59 journaled in the bracket 44, in addition to a bevel pinion 60, also mounted on the stub shaft and engaging a bevel gear 61 on the longitudinally arranged shaft 41, operatively connects the latter shaft with the gear units 53 to effect longitudinal movement of the support in the roller guide or trackway in response to rotation of the shaft 41.

It will be apparent that during its initial and final movement on the trackway, the support travels slowly but that during the intermediate portion of its travel this movement is materially increased by reason of engagement of the larger gears 52 with the intermediate rack sections.

Rotation of the shaft 41 is effected by a reversible motor 62 preferably hung in straps 63 secured to one of the main sills 6 and to its adjacent supplementary sill 10. A chain 64 running over a sprocket 65 on the motor shaft 66 and over a sprocket 67 on the shaft 41 operatively connects the latter shaft with the motor.

Since obviously, the support or frame for the receiving unit can not be longer than the diameter of the elevator platform and it would, therefore, be impossible for the support to be extended sufficiently to move a vehicle onto the platform unless the platform were of much greater diameter than the length of the vehicle, further or secondary extension means generally designated 68, is provided.

A clutch unit 69 of the secondary extension means is mounted on a truck or carriage 70, preferably comprising a pair of parallel, vertically positioned plates 71 having transversely aligned notches 72 in their upper edges for seating clutch mechanism, as presently described.

Rods 73, having reduced threaded ends 74 extended through openings 75 in the plates adjacent their ends and provided with nuts 76 threaded on the ends 74 rigidly maintain the plates in properly spaced relation, and flanged wheels 77, rotatably mounted by bearing brackets 78, secured by bolts 79 to the plates, are arranged for travel on inwardly directed flanges 33 and 34 of the T-rails 31 and 32, respectively.

Figure 22:
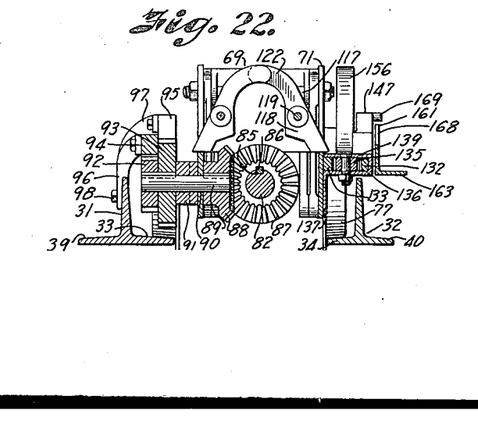
Fig. 22 is an enlarged cross section through the clutch of the receiving unit.

Longitudinal movement of the carrier on the T-rails is effected by apparatus including a shaft 82 journaled at opposite ends in bearings 83 and 84 mounted on or formed integrally with the cross plates 35 and 36, respectively. The shaft 82 is provided throughout its length with a key seat 85 to receive a key 86 fixed in a bevel gear 87 slidably mounted on the shaft and meshed with a bevel pinion 88 keyed on the inner end of a stub shaft 89 extended through an aperture 90 provided in one of the plates 71, Fig. 22. The stub shaft is further rotatably carried in a bearing 91 bolted or otherwise secured to the plate, and fixed on the outer end of the stub shaft are juxtaposed gears 92 and 93 adapted to mesh respectively with end and intermediate rack sections 94 and 95. As in the case of the rack bar 49, the intermediate section is offset from the aligned end sections for engagement by the larger gear 93 so that upon rotation of the shaft 82 the carrier will be propelled comparatively slowly at the beginning and end portions of its movement but will move much faster throughout the intermediate portion of its travel on the T-rails. The rack sections 94 and 95 are suitably supported as by brackets 96 and 97 secured by bolts 98 or the like to the rail 31.

Figure 5:
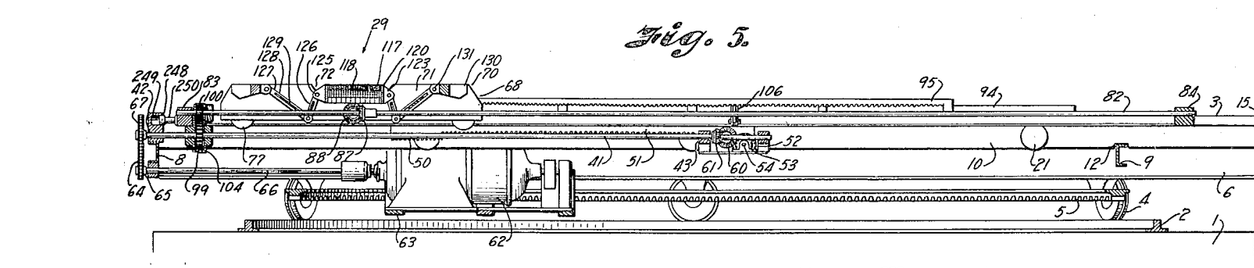
Fig. 5 is a central longitudinal section of the unit shown in Fig. 4.
Figure 6:
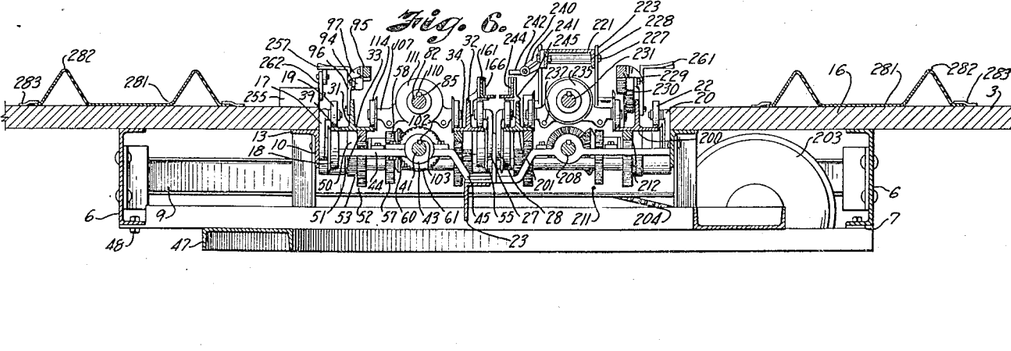
Fig. 6 is a cross section on the line 6—6, Fig. 7, showing gear mechanism for effecting longitudinal travel of the receiving and delivery units.
Figure 7:
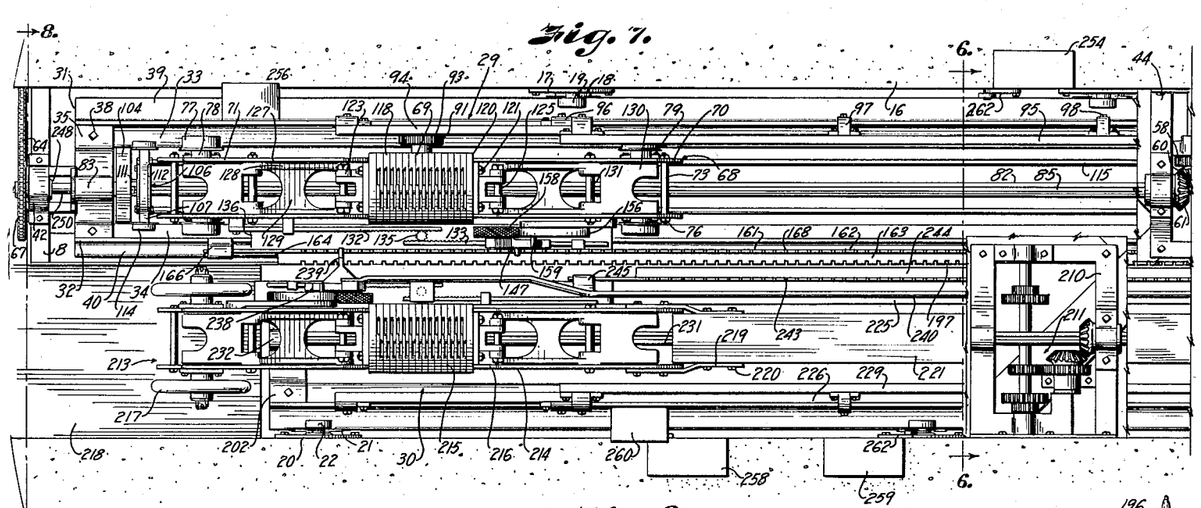
Fig. 7 is a plan view, on an enlarged scale, of the clutch ends of the receiving and delivery units.
Figure 8:
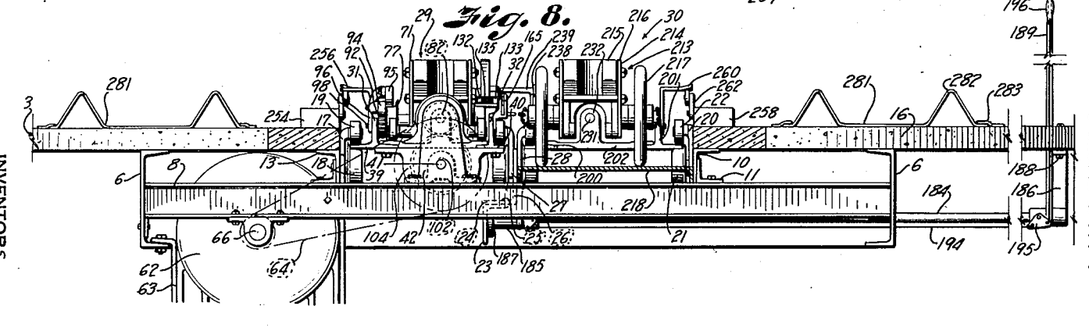
Fig. 8 is a sectional view on the line 8—8, Fig. 7, showing the vehicle-moving units in end elevation.
Figure 9:
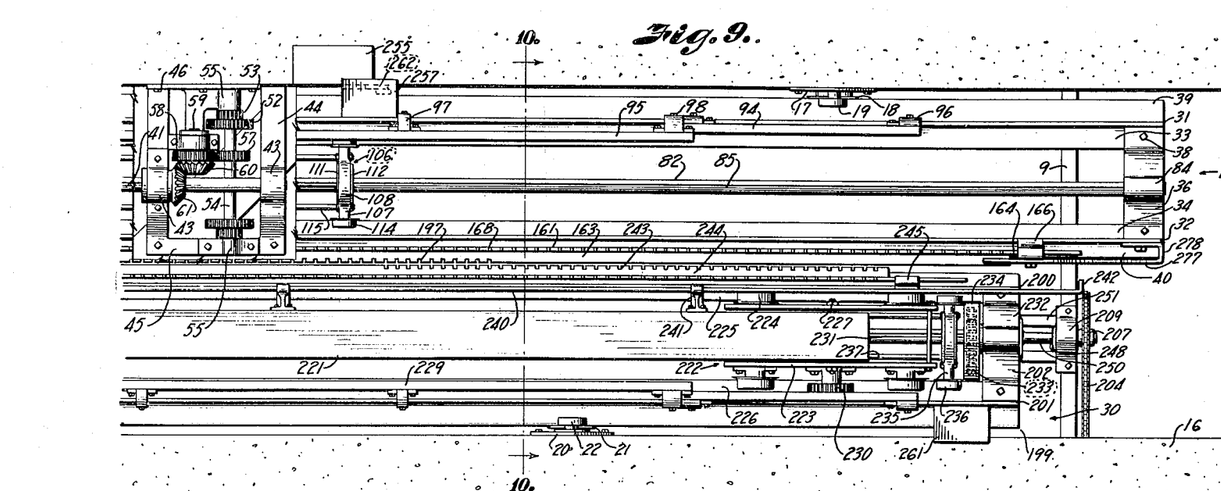
Fig. 9 is a continuation of the plan view shown in Fig. 7.

Power for rotating the shaft 82 is preferably supplied by the motor 62 operably connected with the shaft by means of a spur gear 99 mounted on the shaft 41 in meshed relation with a gear 100 fixed on the shaft 82, Fig. 5. The gear 99 is held on the shaft 41 against rotative movement independently of the shaft by suitable means such as a key 102 fixed in the gear for sliding movement in a key seat 103 formed in the shaft 41 throughout its length, and a bearing housing 104 enclosing the gears 99 and 100 is anchored to the lower faces of the T-rails 31 and 32 as indicated at 105, Figs. 5 and 8.

Figure 20:
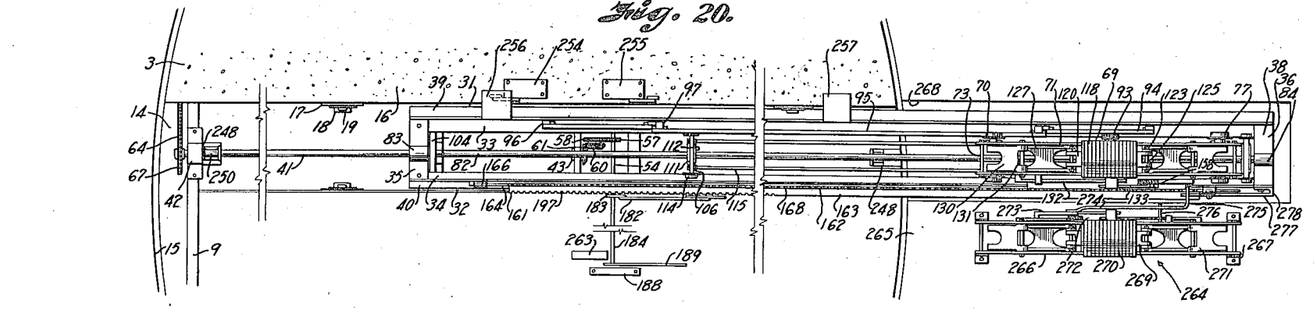
Fig. 20 is a plan view of the receiving unit extended into a parking space and of a lock fixed in the space for retaining a parked vehicle in locked position.
Figure 23:
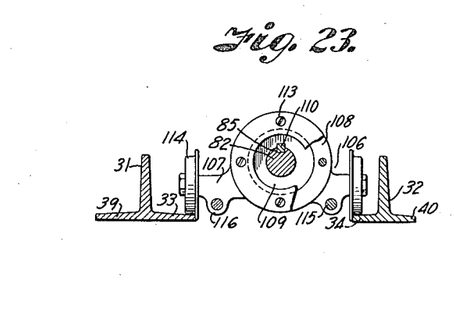
Fig. 23 is an elevational view of a shaft carrier and guide with a portion of the guide housing broken away to more clearly disclose a bearing member.

When the receiving and transfer unit is in fully extended position, as illustrated in Fig. 20, the distance between the bearing 83 and the clutch unit is comparatively great and it is desirable to provide intermediate support for the shaft 82 between these points. This may be satisfactorily accomplished with a pair of movable bearings 106, Fig. 23, each comprising an axle 107 and an integral housing 108 rotatably carrying a collar 109 having a key 110 slidably engaging the key seat of the shaft 82. Rings 111 and 112 fixed on opposite faces of the housing by screws or bolts 113 extend inwardly over the margin of the collar to retain the collar in the housing. Flanged wheels 114 are rotatably mounted on the axles for travel on the inwardly directed flanges 33 and 34 of the T-rails and the axles are held in fixed relation to each other by a pair of parallel rods 115 having their opposite ends anchored in depending ears 116 of the axles.

Figure 11:
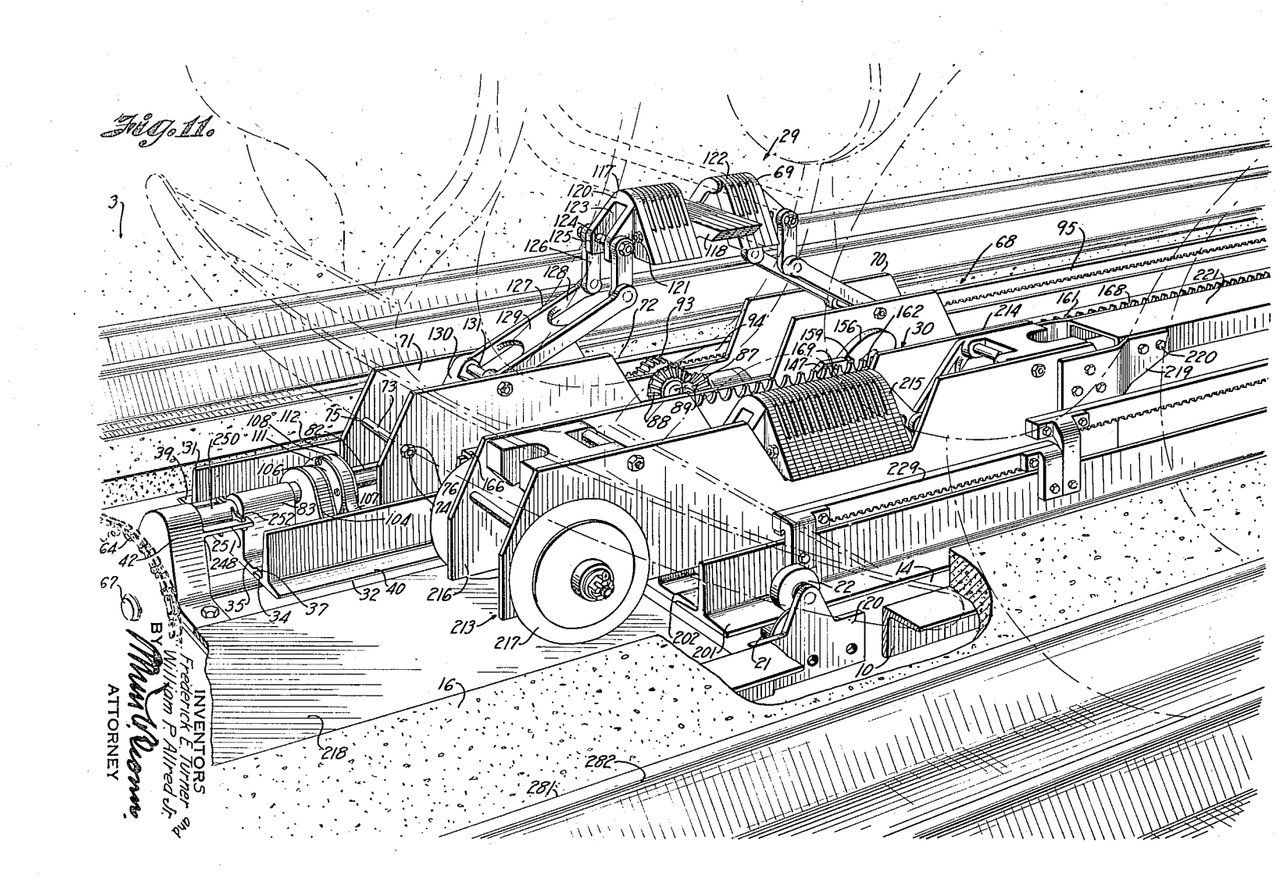
Fig. 11 is an enlarged detail perspective view of the clutch ends of the receiving and delivery units showing the clutch on the receiving unit being raised to axle-engaging position.

The clutch mechanism carried by the receiving unit is designed for engaging vehicle axles of different heights and cross sectional dimensions and will now be described in detail. As will be most readily observed from Figs. 14 and 22, the clutch unit includes an axle engaging body 117 comprised of parallel series of clutch elements 118, each series being rotatably mounted on a rod 119 having its opposite ends extended through end plates 120 and engaged by nuts 121 to hold the clutch body in assembled condition. The upper portions of the elements 118 constitute fingers 122 reduced in thickness and turned inwardly to produce an interlaced relation of the fingers of one series with those of the other series, and upon upward movement of the body to engagement with a vehicle axle as many of the fingers as are engaged by the axle will be swung to a substantially horizontal position (Figs. 11 and 12) to snugly seat the axle. The clutch body 117 is dimensioned to fit into the notches 72 of the vertical plates 71 and, when in lowered position, rests on the plate edges.

In order to provide for elevating the clutch body, pairs of spaced ears 123 are formed on the end plates 120 and provided with apertures 124 for receiving shafts 125, each pivotally carrying a pair of depending links 126. Pivotally connected to the lower end of each pair of links is an arm 127, preferably comprising spaced bar portions 128 connected by a web 129, and terminating at their outer ends in a weight portion 130 extending at an obtuse angle from the bar portions and pivotally mounted between the plates 71 on a transverse shaft 131. Both the web 129 and counterweight portion are suitably notched to prevent interference of these members with the shaft 82.

It will thus be apparent that the arms 127 comprise cranks and the shafts 131 serve as fulcrums for the cranks and that by simultaneously moving the weight portions of the cranks toward each other the bar portions will be raised to elevate the clutch body. Such movement of the cranks is accomplished through the medium of an interconnected mechanism including oppositely extending bars 132 and 133 having adjacent ends provided with teeth 134 engaged with a gear pinion 135 so that actuation of one bar will effect simultaneous operation of the other bar, Fig. 12. The bars are slidably mounted on a horizontal plate or table 136 having a depending flange 137 bolted or otherwise secured to the vertical plate 71 nearest the delivery unit, and the pinion 135 is journaled on a stud 138 extended through the table and through a cover 139 mounted over the pinion and serving as a guide for the bars. The bar 132 is further guided by an offset bracket 140 secured to the plate 71 and is provided on its outer end with an ear 141 having an elongated aperture 142 to receive a cap screw 143 extended through an arcuate opening 144 in the plate and threaded into an ear 145 of the weight portion of one of the crank arms 127.

The outer end of the other bar 133 is guided by a bracket 146 mounted on the table and carried by the bar intermediately of the bracket 146 and the cover 139 is a recessed block 147 mounted for limited sliding movement on the bar by a cap screw 148 extended through an elongated opening 149 in the block and threaded into the bar 133.

The block, in turn, is operatively connected with the other of the crank arms 127 by a link 150 having one end loosely connected to the block by a bolt 151 received in an elongated opening 152 of the block and its opposite end pivotally secured to an ear 153 of the related weight arm by a cap screw 154 extended through an arcuate opening 155 of the plate 71. Interposed between the link 150 and the block and pivotally mounted on the bolt 151 is a brake arm 156 having a lower cam face 157 adapted to frictionally engage a braking surface provided on the table 136 and indicated at 158. The upper end of the arm is weighted to constantly urge the cam face to engagement with the braking surface. Such engagement is prevented, as long as the clutch body is in reposed position, by a pin 159 extending laterally from the brake arm and adapted to ride upwardly along an inclined face 160 onto the upper edge of the block 147, thereby swinging the brake arm on its pivot to disengaged relation with the braking surface.

Figures 12, 13, 14:
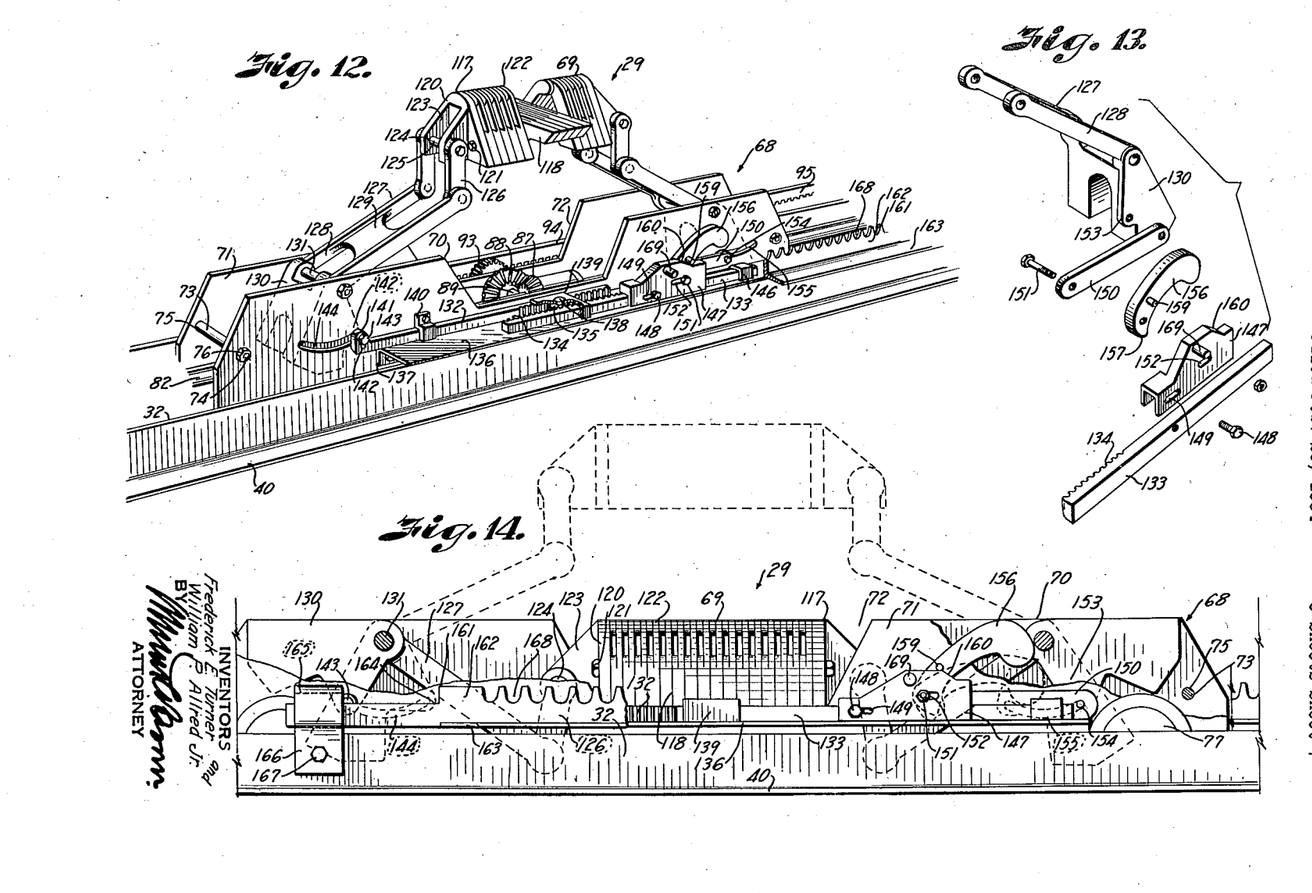
Fig. 12 is a detail perspective view showing the clutch of the receiving unit in fully elevated condition and disclosing the assembled relation of the clutch-actuating mechanism.
Fig. 13 is a perspective view of parts of the clutch-actuating and braking mechanisms in disassembled relation.
Fig. 14 is an elevational view, with parts broken away, of a clutch unit in lowering position and indicating, in dotted lines, the position of the clutch when elevated.
Figure 15:
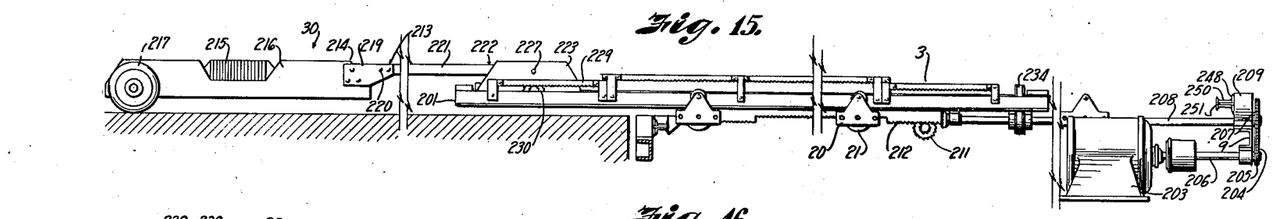
Fig. 15 is an elevational view, partly diagrammatic, of the delivery unit in extended position.

From the foregoing it will be apparent that movement of the block to the left, as viewed in Fig. 14, will result in free travel of the block for a distance corresponding to the length of the elongated openings therein, thus permitting the pin 159 to ride down the inclined face 160 and allow the brake arm to move toward braking position. Continued movement of the block to the left effects elevation of the clutch body through travel of the bars 132 and 133 toward each other. Upon release of the block the weight of the clutch body and of the crank arms exerts a pull on the brake arm to more firmly engage it with the braking surface.

When the block is moved to the right (Fig. 14) its elongated openings permit sufficient free travel of the block to cause the pin 159 to ride upwardly on the inclined face 160 and release the brake so that continued movement of the block in this direction will swing the crank arms to lower the clutch body to a position of repose.

For practical results the block must be operable at all times from a fixed station point on the elevator platform. This may be accomplished by mechanism including a rail 161 in the form of an angle having a vertical flange 162 and an outwardly directed lateral flange 163. At its ends the lateral flange is entirely cut away and a portion of the vertical flange is removed to provide relatively narrow ends 164 for sliding movement in elongated guide openings 165 of brackets 166 secured as by bolts 167 to the T-rail 32 adjacent its ends. The angle rail is of substantially the same length as the T-rail frame and its vertical flange 162 is provided throughout its length with notches 168 for selective engagement by a pin 169 projecting laterally from the block 147.

Normally, however, the angle rail must be supported in disengaged relation with the pin 169 since otherwise the carrier 70 would not be free to travel on the T-rail and for this purpose the elongated guide openings are of greater length than the width of the rail ends 164 to allow the rail to drop out of engagement with the pin.

Figures 18, 19:
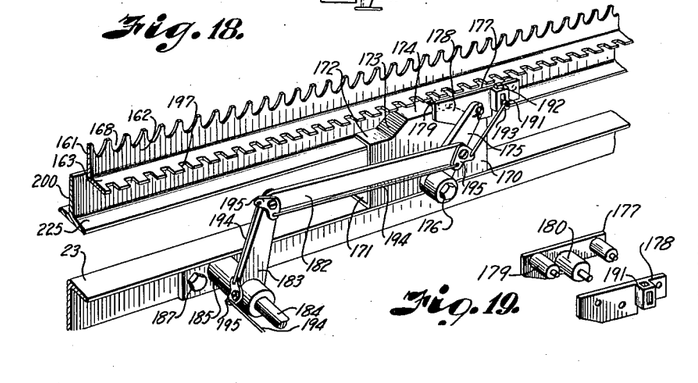
Fig. 18 is a perspective view of similar lever mechanism for operating the clutch of the receiving unit.
Fig. 19 is a perspective view of a rider of the lever mechanism shown in disassembled relation.
Figure 21:
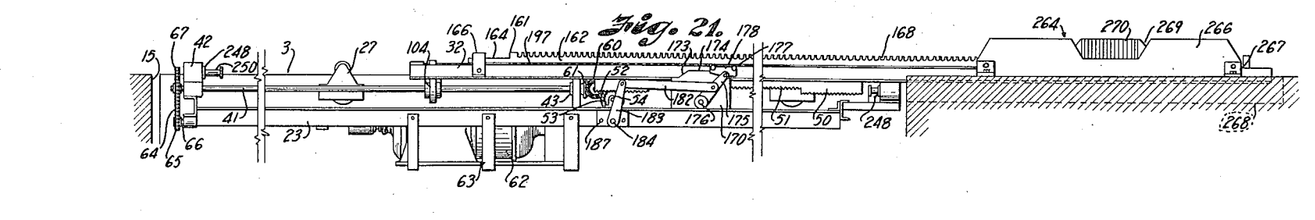
Fig. 21 is a partly diagrammatic, side elevational view of the unit and lock shown in Fig. 20, the floor of the parking space being shown in section.

It is further necessary, therefore, to provide apparatus for elevating the angle rail at will to engagement with the projection or pin 169 and for shifting the rail longitudinally in its guides. Such apparatus includes a vertically positioned angular plate or rider 170 (Figs. 18 and 21) mounted on and fixed by a lower flange 171 to the intermediate sill 23 and having an upper flange 172 provided with inclined converging faces 173 joined by a raised portion 174. A lever arm 175 rotatably mounted on a bolt 176 secured to the angular plate is pivotally connected at its upper end to a cam element 177 comprising spaced plates 178 having a pair of small rollers 179 and a single roller 180 of increased diameter rotatably mounted therebetween. The smaller rollers are arranged at opposite sides of and at a higher elevation than the larger roller for contacting the under side of the angle rail while the larger roller is adapted to ride on the upper flange 172 of the angular plate so that rocking of the lever arm on its pivot and consequent travel of the larger roller up one of the other of the inclined faces 173 will elevate the angle rail to engaged relation with the block 147.

The lever 175 is pivotally connected by a line 182 to the outer end of a crank 183 fixed on one end of a shaft 184 journaled in bearings 185 and 186 respectively anchored to the intermediate sill 23 as shown at 187 and to the elevator floor as indicated at 188.

Mounted on the opposite end of the shaft 184 is a control lever 189 extended through a slot 190 provided in the elevator platform at its approximate center. Thus swinging of the control lever from left to right or vice-versa will cause the cam element 177 to ride upwardly on one of the inclined faces 173 and thereby force the angle rail to engagement with the pin 169 of the block 147. This movement of the control lever does not, however, shift the angle rail longitudinally without some provision for connecting the cam element to the rail. We, therefore, provide a socket member 191 on the outer of the plates 178 and slidably mount a plunger 192 therein, having a lateral pin 193 connected by a series of links or rods 194 and bell crank levers 195 to a grip or handle 196 pivotally mounted on the control lever near its upper end in the usual manner.

A series of notches 197 are cut into the flange 163 of the angle rail so that by grasping the grip 196 and pulling it against the control lever the plunger 192 will be forced upwardly to engagement with one of the notches 197 to connect the cam element to the rail. Operation of the clutch body for engaging or disengaging a vehicle axle is therefore under constant control of the lever 189 located at the approximate center of the elevator platform.

With the apparatus thus far described it is possible, as later more fully disclosed, to receive a vehicle from the entrance runway of the garage, draw the vehicle onto the elevator platform, back it from the platform into a pre-selected parking space after the elevator has been moved to the desired floor, and to redraw the vehicle from the parking space onto the platform. For each of these operations the clutch is engaged with the front axle of the vehicle. As will be readily apparent, however, it is desirable to deliver the vehicle to the exit of the building with the front end of the vehicle directed toward the exit door. Accordingly, when delivered to the patron in the exit, the vehicle should be moved forwardly instead of reversely from the elevator platform and it is for this purpose that the delivery unit 30 is provided since the receiving unit can not be extended sufficiently in a forward direction to accomplish such a result.

In construction, the delivery unit is very similar to the receiving and transfer unit 29 and includes a frame or support 199 comprising spaced T-iron rails 200 and 201, connected at their opposite ends by cross plates 202. The frame thus constructed is longitudinally movable in the guide or trackway provided by the flanged wheels 18 and rollers 19 carried on each of the brackets 20 and 28.

A reversible motor 203, carried by the platform at a point approximately diametrically opposite the motor 62 is connected by a chain 204 running over a sprocket 205 on the motor shaft 206 to a sprocket 207 fixed on a shaft 208 parallel to the frame 199. The latter shaft is journaled at its outer ends in a bearing 209 on the cross sill 9 and in a bearing bracket 210 identical to the bearing bracket 44, previously described, and through the medium of a gear train 211 on the bracket 210 and racks 212 secured to the lower faces of the T-rails 200 and 201, rotation of the shaft 206 by the motor 203 will move the frame or support 199 longitudinally in its guides.

The extension of the delivery unit provided by longitudinal movement of the support 119 on the vehicle platform is in itself insufficient to move a vehicle the required distance from the platform and secondary extension means 213 is, therefore, also provided for the delivery unit.

The secondary extension means includes a carrier 214 very similar to the carrier 70 of the receiving and transfer unit in that it is provided with a clutch body 215 hung for vertical movement between a pair of notched plates 216 in exactly the same manner as the clutch body 117. The carrier 214 is not, however, mounted directly on the support 199 but is provided at one end with a pair of rubber tired wheels 217 resting on a floor portion 218 of the elevator platform when the delivery unit is positioned in retracted position on the platform.

Secured to the opposite end of the carrier 214 by brackets 219 and bolts or the like 220 is an inverted channel 221 leading from the carrier at one end of the delivery unit to a truck 222 mounted on the T-rails at the opposite end of the unit and arranged for longitudinal travel on the rails.

The truck 222 preferably comprises a pair of plates 223, provided with pairs of flanged wheels 224 for running on inwardly directed flanges 225 and 226 of the rails 200 and 201, respectively. The end of the channel 221 adjacent the truck is pivotally mounted between the plates 223 on a shaft or bolt 227 extended transversely through the plates and through side flanges 228 of the channel to provide a hinged connection between the carrier and truck as required when the level of the elevator floor does not exactly correspond with the level of the exit runway.

It is desirable to move the truck at comparatively low speed during the beginning and end of its travel on the rails 200 and 201 and to increase this speed during the intervening portion of travel. The structure described for accomplishing a like result with the carriage 70 of the receiving and transfer unit is, therefore, duplicated for the truck and includes a rack 229 engageable by a gear train 230 operably connected with a shaft 231 journaled at opposite ends in bearings 232 preferably formed integrally with the cross plates 202.

Meshed spur gears 233 enclosed in a housing 234 connect the shaft 231 with the shaft 208, it being obvious for reasons fully described in conjunction with the receiving unit that these shafts must be provided throughout their length with key seats for slidably engaging driving pinions mounted on the shafts.

Spaced bearings 235 movably mounted by flanged wheels 236 on the T-rails 200 and 201 and connected by rods 237 are also provided to support the intermediate portion of the shaft 231.

The clutch actuating mechanism for the delivery unit including the operating bars, crank arms and brake, is identical to that of the receiving unit and will not, therefore, be described in detail. A block 238 of this mechanism corresponding with the block 147 of the previously described mechanism is provided with a pin or finger 239 of materially greater length than the pin 169 of the block 147 so that it extends over and is adapted to be engaged by the notches 168 of the angle rail 161 for a purpose presently disclosed.

One end of a rod 240 guided in bearing brackets 241 secured to the inner side flange of the inverted channel 221 is also fixed to the block 238 and the opposite end of the rod is bent inwardly as shown at 242 for engaging the notches 243 of an angle rail 244 slidably mounted in brackets 245 supported by the T-rail 200.

Figure 16:
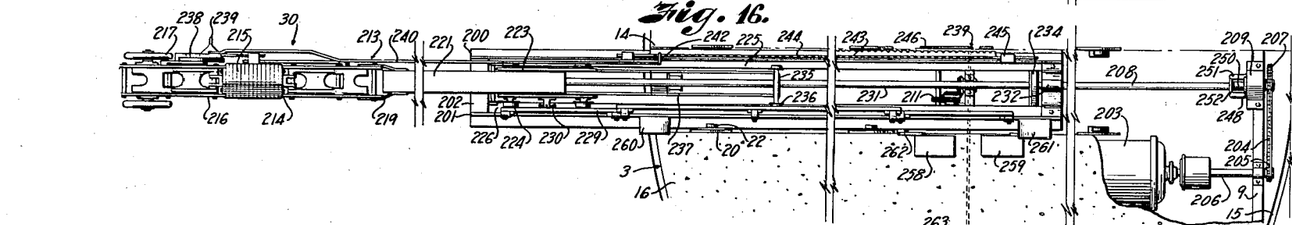
Fig. 16 is a plan view of Fig. 15.
Figure 17:
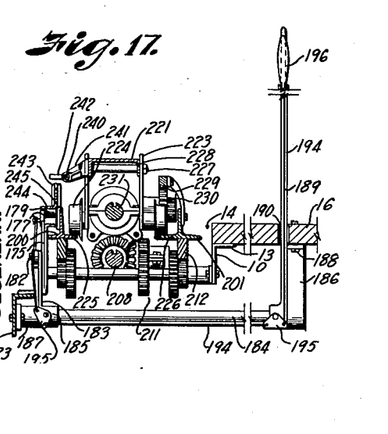
Fig. 17 is a cross section of the delivery unit showing lever mechanism for operably connecting a control lever with the clutch-actuating members.

In construction, the angle rail 244 is a duplicate of the rail 161 and the mechanism, generally designated 246, Fig. 16, for elevating and longitudinally moving the angle rail 244, is the same as that provided for actuating the rail 161, a control lever 247 located near the control lever 189 being employed for operating the mechanism 246.

At opposite limits of their longitudinal travel on the T-rails the receiving and delivery units are both cushioned by suitable shock absorbers indicated at 248. The type of shock absorber preferred is particularly shown in Figs. 5 and 11, wherein the absorber housing comprises an integral part of the bearing 42 and is provided with a bore 249 for slidably receiving a plunger 250 adapted to abut the bearing 83. Guides 251 on the bearing and plunger housing 42 are adapted to slide between fingers 252 on the plunger and are spaced sufficiently to receive the upper portion of the bearing 83 therebetween.

It is further desirable to provide for automatically limiting the longitudinal movement of the receiving and delivery units by control of the motors 62 and 203 respectively. This may be accomplished, for example, by providing switch blocks 254—255 alongside the receiving unit for respective engagement by spaced contact plates 256—257 fixed to the rail 31, and similarly providing switch blocks 258—259 and respective contact plates 260—261 for the delivery unit, roller-carrying arms 262 of the several switch blocks being urged upwardly by suitable resilient mechanism to a position for engagement by the contact blades when said blades pass thereover.

The manner of wiring the switch blocks to the motors for automatically stopping the motors, and of connecting the motors with a switch panel 263 located for convenience near the control levers on the platform to provide for manually controlling starting of the motors, is not shown in detail as it does not constitute a part of our invention and can be readily determined by a skilled electrician.

While the receiving and delivery units heretofore described are capable of performing the necessary vehicle-moving operations, a lock assembly 264 is further provided for each parking space 265 of the garage to positively hold a vehicle while parked therein.

The construction of the lock assembly is almost identical to that of the carrier and clutch mechanism of the receiving unit as will be clear from Fig. 20. Side plates 266 of the assembly 264 are anchored as indicated at 267 to the floor adjacent to and in parallel relation with a recess 268 provided in the floor for receiving the projected end of the receiving unit at a level substantially equal to that of the lock.

A clutch mechanism 269 of the lock, including a clutch body 270, crank arms 271 and actuating bars 272 exactly like corresponding parts of the receiving and delivery units, is provided with a block 273 pivotally mounting a rod 274 corresponding with the rod 240 of the delivery unit and having its free end 275 bent laterally for engaging the notched angle rail 161 as presently disclosed.

The free end of the rod 274 is normally supported by a pin or bracket 276 projecting laterally from the plate 266 nearest the recess 268 of the floor.

In order to compensate for slight variations in the elevator platform and parking floor levels, a guide bar 277 is provided having a retractively bent end 278 secured to the T-rail 32 and its remaining portion bent upwardly and anchored by a bolt 279 or the like to the adjacent bracket 166. A horizontal portion 280 of the guide bar extends beyond the bracket so that upon movement of the receiving unit into a parking space the free end of the rod 274 will ride upwardly on the guide bar (Fig. 24) and be carried thereon for engagement by the angle rail 161 when said rail is elevated in its guide brackets 166.

The wheels of a vehicle moved onto and from the elevator platform may be guided by tracks 281 comprising metal sheets provided with inverted V-shaped rail portions 282 adjacent their side edges, strips 283 suitably secured to the floor of the elevator platform being preferably used for rigidly anchoring the tracks to the floor. Guides 284 adapted to align with the tracks 281 may likewise be provided in the entrance and exit driveways and in the parking spaces if desired.

Assuming vehicle-moving apparatus to be constructed and assembled as described, operation thereof would be as follows:

The vehicle to be parked is driven into the entrance driveway to a position near the elevator shaft and its motor is stopped. No brakes are set but the ignition switch and the doors of the vehicle may be locked since, throughout the parking and delivering operations, the vehicle need not be entered by the station attendant nor does he use the vehicle's motor.

The elevator operator stationed at his controls, i. e., the control levers 189 and 247 and the switch panel 263, closes a switch to start operation of the motor 62 in one direction for fully extending the receiving and transfer unit, the circuit to the motor being automatically opened by contact of the switch blade 256 with the contact arm on the switch block 254.

Figures 1, 2A:
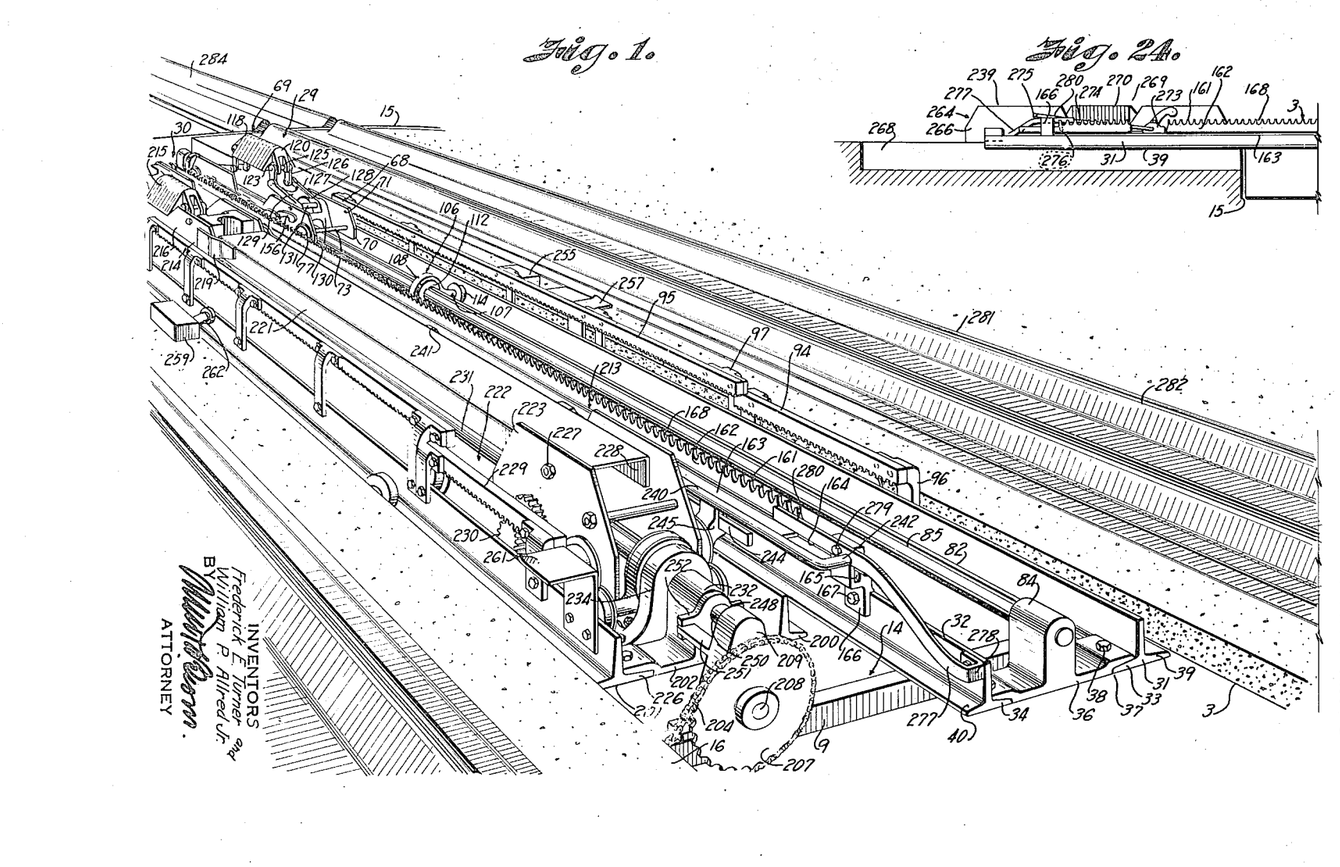
Fig. 1 is a perspective view of a portion of an elevator floor carrying vehicle-moving apparatus constructed in accordance with our invention.
Figure 2:
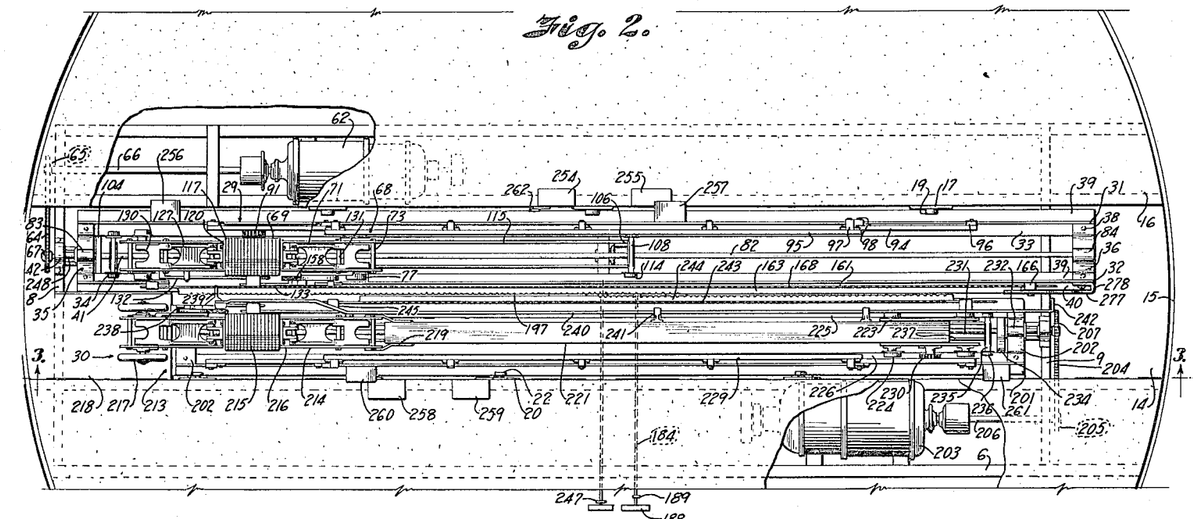
Fig. 2 is a plan view of the vehicle-moving apparatus in retracted position on an elevator platform, partly broken away to disclose motors for propelling the apparatus.
Figure 3:
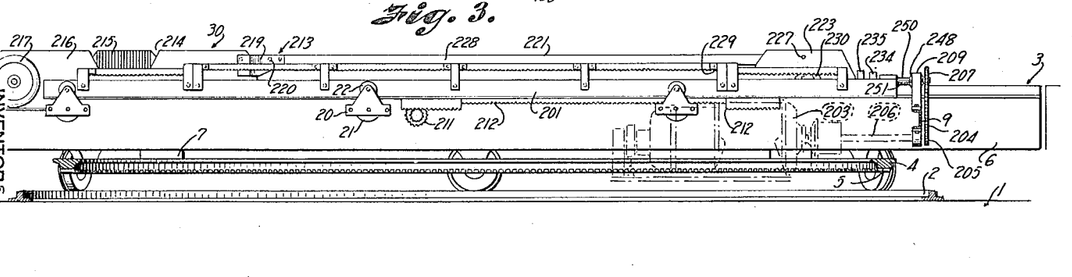
Fig. 3 is a longitudinal section on the line 3—3, Fig. 2 showing a delivery unit in side elevation and in retracted position.
Figure 4:
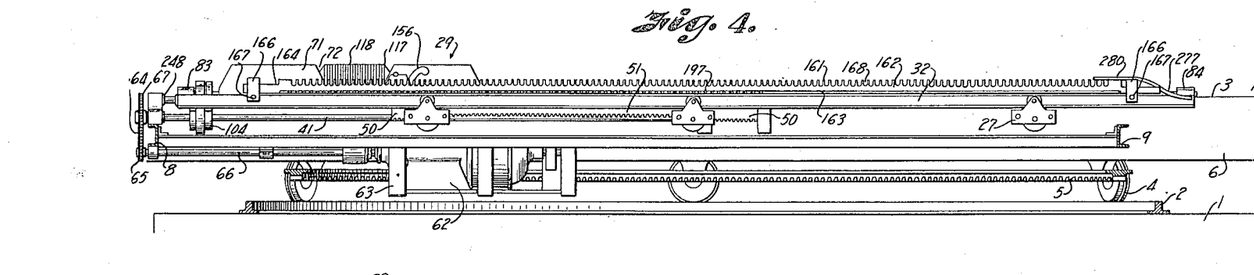
Fig. 4 is a side-elevational view of a receiving and parking unit in retracted position on the elevator platform.

As previously explained, initial and final movement of the T-rail 31—32 on the platform and of the carrier 70 on the T-rail frame is relatively slow but this speed is materially increased by reason of engagement of the larger gears 52 and 93 with the intermediate rack sections 51 and 95. With the receiving unit in fully extended position, the clutch body 117 is located immediately below the front axle of the vehicle. The operator now rocks the control lever 189 from the right (Fig. 2) to a substantially vertical position to carry the cam element 177 upwardly on the angle plate or rider 178, thereby elevating the angle rail 161 to engagement with the pin 169 of the block 147. He then grasps the grip 196 on the control lever to move the plunger 192 into one of the notches in the horizontal flange of the angle rail and continues to move the control lever 189 toward the left to shift the angle rail longitudinally and elevate the clutch body 117 to operative engagement with the front axle. He next closes another switch to start operation of the motor 62 in a reverse direction to retract the receiving mechanism and thereby draw the vehicle onto the elevator platform. Such movement is automatically terminated by contact of the blade 257 with the switch 255, whereby the supply of current to the motor is cut off.

After the elevator has been raised to the desired floor of the storage building and the elevator platform has been rotated on its turntable to align the vehicle with a pre-selected parking space, the circuit to the motor 62 is again established for extending the delivery mechanism to move the vehicle rearwardly into its space. The control lever 189 is now moved to the right to again raise the angle rail 161, the grip 196 is drawn against the lever to operably connect the rail with the lever, and the rail is shifted to the right to raise the brake arm 156 and to lower the clutch body out of engaged relation with the vehicle axle. It should be noted, however, that when the angle rail was last raised it was also engaged by the lateral extension 275 on the rod 274 of the lock assembly, this extension automatically riding up the guide bar 277 during movement of the receiving unit into the parking space. Consequently swinging of the control lever 189 to the right for lowering the clutch body 117 as described immediately above simultaneously effected elevation of the clutch body 270 to engagement with the front axle of the vehicle, thereby securely locking the vehicle in its parked position. The released receiving unit is thereupon retracted onto the platform in the manner described above.

When the patron returns for his parked vehicle the elevator platform is again moved to the proper floor and rotated during vertical travel to align the vehicle-moving apparatus with the parking space containing the desired vehicle, whereupon the operator swings the control lever 189 from left to right to disengage the clutch body 270 from the axle and to simultaneously move the clutch body 117 to axle-engaging position. The vehicle is now returned onto the elevator platform through retraction of the delivery unit by the motor 62.

Again the control lever 189 is swung from right to left to raise and shift the angle rail 161 for lowering the clutch body 117 out of engagement with the axle of the vehicle but the rail, while raised, engaged the finger 239 of the delivery unit and coincidently with lowering of the clutch body 117 the corresponding clutch 215 of the delivery unit was raised to locked relation with the vehicle axle.

The elevator is next lowered to the delivery floor and the platform rotated during descent to properly align the vehicle with the exit driveway. The operator now closes the circuit to the motor 203 to effect rotation of this motor in one direction for extending the delivery unit and moving the vehicle into the exit driveway. Such extension of the latter unit automatically terminates upon opening of the motor circuit incident to contacting of the plate 261 with the switch of the block 259.

Upon rocking of the control lever 247 to the left (Fig. 2) the angle rail 244 is raised to engagement with the rod 240 and by shifting this rail to the left the clutch 215 is released from the axle and the vehicle is free to be driven away under its own power.

By closing a suitable switch on the panel 263 operation of the motor 203 is reversed, thereby moving the delivery unit retractively onto the platform until the circuit to the motor is again broken by contact of the plate 260 with the switch block 258.

From the foregoing it will be apparent that throughout the operations of receiving, parking and delivering the vehicle the operator did not touch the vehicle but that all operations were controlled from the one control station on the elevator platform. Consequently, the wear to which vehicles are subjected when driven up and down the ramps of ordinary storage garages is entirely eliminated with the use of apparatus constructed in accordance with our invention.

What we claim and desire to secure by Letters Patent is:

1. In apparatus of the character described, a platform, a support carried by the platform for longitudinal movement thereon, a carrier movably mounted on the support, means for moving said support longitudinally on the platform, means operatively connected with said support-moving means for moving the carrier on the support, and a wheeled extension connected with the carrier.

2. In apparatus of the character described for moving a vehicle, a platform, a support, wheels mounting the support for rolling longitudinal movement on the platform, a carrier movably mounted on the support, a clutch on the carrier engageable with an axle of the vehicle, interdependent means for moving said support longitudinally on the platform and for moving the carrier on the support, and means for actuating said clutch.

3. In apparatus of the character described for moving a vehicle, a platform, a support, wheels mounting the support for rolling longitudinal movement on the platform, a carrier movably mounted on the support, a clutch pivotally supported for vertical movement on the carrier, interconnected means for moving said support longitudinally on the platform and for moving the carrier on the support, and means for pivoting said clutch upwardly for engaging an axle of the vehicle.

4. In apparatus of the character described, a platform, a support carried by the platform for longitudinal movement thereon, actuators having differential driving connections with the support for successively moving said support longitudinally on the platform at a higher rate of speed intermediate its limits of travel than near the ends of its movement, driving means for said actuators, a carrier, movably mounted on the support, and means for moving the carrier on the support.

5. In apparatus of the character described, a platform, a longitudinally movable support carried by the platform, means for moving said support longitudinally on the platform, a carrier mounted for longitudinal movement on the support, actuators having differential driving connections with the support for moving the carrier on the support at a lower rate of speed at the beginning and end of its travel than during the intermediate portion of its travel, and means for driving said actuators.

6. In apparatus of the character described, a platform, a longitudinally movable support carried by the platform, a carrier movably mounted on the support, actuators having differential driving connections with the support for moving said support longitudinally on the platform at a higher rate of speed intermediate its limits of travel than near the ends of its movement, means for moving the carrier on the support at a lower rate of speed at the beginning and end of its travel than during the intermediate portion of its travel, and means for operating said actuators including means for actuating said carrier moving means.

7. In apparatus of the character described for moving a vehicle, a platform, a longitudinally movable support carried by the platform, a carrier movably mounted on the support, a clutch pivotally supported for vertical movement by the carrier, means for moving the support longitudinally on the platform and for moving the carrier on the support, means for pivoting said clutch upwardly for engaging an axle of the vehicle, a brake for retaining the clutch in axle-engaging position, and means for releasing said brake.

8. In apparatus of the character described, a platform, guides carried by the platform, a support including a pair of parallel T-rails having inwardly directed flanges and having outwardly directed flanges mounted in the guides for longitudinal movement of the support on the platform, a carrier having wheels mounted for longitudinal travel on said inwardly directed flanges of the rails, and means for moving the rails longitudinally in the guides and for propelling said carrier longitudinally on the rails.

9. In apparatus of the character described, a platform, guides carried by the platform, a support including a pair of parallel rails mounted for longitudinal movement in the guides, a rack on one of said rails, a gear carried by the platform in meshed relation with the rack, means for rotating said gear to propel the support longitudinally on the platform, a carrier movably mounted on the rails, and means operably connected with said gear-rotating means for moving said carrier longitudinally along the rails.

10. In apparatus of the character described, a platform, a support including a pair of parallel rails mounted for longitudinal movement on the platform, a shaft rotatably carried by the platform in parallel relation with said rails, a rack on one of said rails, a gear train operatively connecting said shaft with the rack, means for rotating the shaft to effect longitudinal movement of the support on the platform, a carrier movably mounted on the rails, and means associated with said shaft-rotating means for propelling the carrier longitudinally along the rails.

11. Apparatus of the character described including a platform, a longitudinally movable support carried by the platform, a rack on the support comprising aligned end sections and an intermediate section in offset relation to the end sections, a gear unit rotatably carried by the platform comprising a relatively small gear for meshing with the end sections of the rack and a gear of greater diameter for meshing with the intermediate sections of the rack, and means for rotating said gears to effect relatively slow movement of the support at the beginning and end of its travel and a faster movement during its intermediate portion of longitudinal movement.

12. Apparatus of the character described including a platform, a longitudinally movable support carried by the platform, a rack on the support comprising aligned end sections and an intermediate section in offset relation to the end sections, a gear unit rotatably carried by the platform comprising a pair of gears of unequal diameters meshed respectively with the intermediate and with the end sections of the rack, and means for rotating the gear unit to effect longitudinal movement of the support on the platform at a different rate of speed during the beginning and end of its travel than during the intermediate portion of its movement.

13. Apparatus of the character described including a platform, a longitudinally movable support carried by the platform, a rack on the support comprising aligned end sections and an intermediate section in offset relation to the end sections, a gear unit rotatably carried by the platform comprising comparatively small and large gears for respectively meshing with the end and intermediate rack sections, means for rotating the gear unit to propel the support longitudinally on the platform at a slower rate of speed during the beginning and end of its travel than during its intermediate portion of movement, a carrier movably mounted on the rails, and means operatively connected with said gear-rotating means for moving the carrier longitudinally along the support.

14. Apparatus of the character described including a platform, a longitudinally movable support carried by the platform, a rack on the support comprising aligned end sections and an intermediate section in offset relation to the end sections, a gear unit rotatably carried by the platform comprising comparatively small and large gears for respectively meshing with the end and intermediate rack sections, means for rotating the gear unit to propel the support longitudinally on the platform at a slower rate of speed during the beginning and end of its travel than during its intermediate portion of movement, a second rack on the support comprising aligned end sections and an intermediate section in offset relation to the end sections, a carrier movably mounted on the support, a gear unit journaled in the carrier comprising relatively small and large gears for respectively meshing with the end and intermediate sections of the last named rack, and means for rotating the last named gear unit to propel the carrier on the support at a slower rate of speed during the beginning and end of its travel than during its intermediate portion of movement.

15. Apparatus of the character described including a platform, a longitudinally movable support carried by the platform, a rack on the support comprising aligned end sections and an intermediate section in offset relation to the end sections, a gear unit rotatably carried by the platform comprising comparatively small and large gears for respectively meshing with the end and intermediate rack sections, a carrier movably mounted on the support, a second rack on the support comprising aligned end sections and an intermediate section in offset relation to the end sections, a gear unit journaled in the carrier comprising relatively small and large gears for respectively meshing with the end and intermediate sections of the last named rack, and operably connected means for rotating the gear units to propel the support longitudinally on the platform and the carrier longitudinally on the support at slower rates of speed during the beginning and end of their movements than during the intermediate portion of their travel.

16. Apparatus of the character described including a support, a wheeled carrier mounted for longitudinal movement on the support, a rack carried by the support, a gear unit journaled on the carrier for meshing engagement with the rack, a shaft in parallel relation to the support, a gear slidably mounted on the shaft in non-rotative relation to the shaft and meshed with said gear unit, means for rotating the shaft to propel the carrier longitudinally on the support, a vertically movable clutch pivotally mounted on the support, and means for pivoting the clutch upwardly irrespective of the position of the carrier on the support.

17. Apparatus of the character described including a support, a carrier mounted for longitudinal movement on the support, means for propelling the carrier longitudinally along the support, a clutch unit including a clutch and opposed arms hinged at their inner ends to the clutch and pivoted intermediate their ends on the carrier, and means for drawing the outer ends of said arms toward each other to elevate the clutch.

18. Apparatus of the character described including a support, a carrier mounted for longitudinal movement on the support, means for propelling the carrier longitudinally along the support, a clutch unit including a clutch and opposed arms hinged at their inner ends to the clutch and pivoted intermediate their ends on the carrier, means for drawing the outer ends of said arms toward each other to elevate the clutch, and brake means for retaining the clutch in elevated position.

19. Apparatus of the character described including a support, a carrier mounted for longitudinal movement on the support, means for propelling the carrier longitudinally along the support, a clutch unit including longitudinally aligned arms pivoted intermediate their ends to the carrier, a clutch, links pivotally connecting the clutch to the inner ends of said arms, bars pivotally connected to the outer ends of said arms, and means operatively connecting said bars to effect simultaneous movement of the bars toward or away from each other for respectively elevating and lowering said clutch.

20. Apparatus of the character described including a support, a carrier mounted for longitudinal movement on the support, means for propelling the carrier longitudinally along the support, a clutch unit including longitudinally aligned arms pivoted intermediate their ends to the carrier, a clutch, links pivotally connecting the cltuch to the inner ends of said arms, bars pivotally connected to the outer ends of said arms, means operatively connecting said bars to effect simultaneous movement of the bars toward or away from each other for respectively elevating and lowering said clutch, and brake means operably connected with one of said bars for retaining the clutch in elevated position.

21. Apparatus of the character described including a support, a carrier mounted for longitudinal movement on the support, means for propelling the carrier longitudinally along the support, a clutch unit including a clutch and opposed arms hinged at their inner ends to the clutch and pivoted intermediate their ends on the carrier, bars pivotally connected to the outer ends of said arms, means operably connecting said bars, a toothed rail carried by the support for longitudinal and vertical movement thereon, means for elevating the rail, means operably engaging the rail with one of said bars when said rail is elevated, and means for shifting the elevated rail longitudinally on the support to effect operation of said bars for elevating and lowering the clutch.

22. Apparatus of the character described including a support, a carrier mounted for longitudinal movement on the support, means for propelling the carrier longitudinally along the support, a clutch unit including a clutch and opposed arms hinged at their inner ends to the clutch and pivoted intermediate their ends on the carrier, weights on the outer ends of the arms to counteract the weight of said clutch, and common means for simultaneously drawing the weighted outer ends of the arms toward each other to elevate the clutch and for forcing said weighted ends away from each other to lower the clutch.

23. Apparatus of the character described including a support, a carrier mounted for longitudinal movement on the support, means for propelling the carrier longitudinally along the support, a clutch unit including a clutch and opposed arms hinged at their inner ends to the clutch and pivoted intermediate their ends on the carrier, means for drawing the outer ends of said arms toward each other to elevate the clutch, operably connected bars pivoted to the outer ends of said arms, a brake, lost-motion means connecting said brake with one of the bars, and means for actuating the lost-motion means to effect elevation of the clutch and setting of the brake for retaining the clutch in elevated position.

24. In an apparatus of the character described, a platform, a support, means movably mounting the support on the platform, a carrier, means movably mounting the carrier on the support, actuators having differential driving connections with the support for moving the support on the platform at differential speeds, a second set of actuators having differential driving connections with the support for moving the carrier at differential speeds on the support, and means for operating said actuators.

25. In an apparatus of the character described, a platform, a transfer unit, means movable mounting the transfer unit on the platform, actuators having differential driving connections with the transfer unit for moving the transfer unit at differential speeds on the platform, and means for operating said actuators.

26. In an apparatus of the character described, a platform member, a transfer member, means for movably mounting the transfer member for longitudinal movement on the platform, differential size gears on one of said members, racks on the other member for respectively and successively engaging said gears, and means for rotating the gears to move the transfer member at differential speeds on the platform member.

27. In an apparatus of the character described, a platform, a support, means movably mounting the support on the platform, differential size gears on the platform, racks on the support for respectively and successively engaging said gears, and means for actuating said gears for moving the support at differential speeds on the platform.

28. In an apparatus of the character described, a platform, means movably mounting the support on the platform, actuating means for moving the support on the platform, a carrier, means movably mounting the carrier on the support, differential size gears on the carrier, racks on the support for respectively and successively engaging said gears, and means for actuating the gears to move the carrier on the support at differential speeds.

29. In an apparatus of the character described, a platform, a support, means movably mounting the support on the platform, a carrier, means movably mounting the carrier on the support, actuating means for moving the support longitudinally of the platform and the carrier longitudinally of the support, a wheeled extension for the carrier, and means pivotally connecting the wheeled extension with the carrier.

30. In an apparatus of the character described, a platform, a support, means movably mounting the support on the platform, a carrier movably mounted on the support, actuators having differential driving connections with the support for moving the carrier at differential speeds on the support, means for operating said actuators, and a wheeled extension for the carrier movable on the platform upon movement of the carrier on said support.

31. In an apparatus of the character described, a platform, a support, means movably mounting the support on the platform, a carrier movably mounted on the support, actuators having differential driving connections with the support for moving the carrier at differential speeds on the support, means for operating said actuators, an extension member, means pivotally connecting one end of the extension member with the carrier, wheels for supporting the opposite end of the extension member and having rolling support on the platform, and a clutch member carried by said extension.

32. In an apparatus of the character described, a platform, a support, means mounting the support for longitudinal movement on the platform, a carrier, means movably mounting the carrier on the support, means for moving the support longitudinally on the platform, means for moving the carrier longitudinally on the support, an extension member, means pivotally connecting one end of the extension member with the carrier, wheels for supporting the opposite end of the extension member and having rolling support on the platform, and a clutch member carried by said extension.

FREDERICK E. TURNER.
WILLIAM P. ALLRED, Jr.